(12) United States Patent
Al-Laham

(10) Patent No.: US 9,226,511 B2
(45) Date of Patent: Jan. 5, 2016

(54) DEVICE AND METHOD FOR SEPARATING A FATTY STRUCTURE CONNECTED TO AN INTESTINE FROM THE INTESTINE BY MEANS OF CUTTING

(71) Applicant: Teeuwissen Technology B.V., Katwijk NB (NL)

(72) Inventor: Mohamad Jalal Al-Laham, Katwijk (NL)

(73) Assignee: Teeuwissen Operations B. V., Katwijk (NL)

( * ) Notice: Subject to any disclaimer, the term of this patent is extended or adjusted under 35 U.S.C. 154(b) by 0 days.

(21) Appl. No.: 14/380,157

(22) PCT Filed: Feb. 14, 2013

(86) PCT No.: PCT/NL2013/050086
§ 371 (c)(1),
(2) Date: Aug. 21, 2014

(87) PCT Pub. No.: WO2013/125947
PCT Pub. Date: Aug. 29, 2013

(65) Prior Publication Data
US 2015/0017895 A1    Jan. 15, 2015

(30) Foreign Application Priority Data
Feb. 21, 2012   (NL) ...................................... 2008327

(51) Int. Cl.
*A22C 17/00*   (2006.01)
*A22C 17/16*   (2006.01)

(52) U.S. Cl.
CPC ..................................... *A22C 17/16* (2013.01)

(58) Field of Classification Search
USPC .................. 452/106, 110–114, 117, 123, 177
See application file for complete search history.

(56) References Cited

U.S. PATENT DOCUMENTS

| 1,876,258 | A |   | 9/1932 | Miller, Jr. |
| 3,882,571 | A | * | 5/1975 | Evers et al. ................... 452/123 |
| 3,918,124 | A | * | 11/1975 | Evers et al. ................... 452/123 |
| 4,590,643 | A | * | 5/1986 | Hill ................................. 452/112 |
| 4,608,732 | A | * | 9/1986 | Hill et al. ....................... 452/114 |
| 4,951,352 | A | * | 8/1990 | Harben et al. ................. 452/106 |
| 5,318,428 | A | * | 6/1994 | Meyn ............................. 452/106 |
| 6,638,155 | B2 | * | 10/2003 | Jensen et al. .................. 452/117 |

FOREIGN PATENT DOCUMENTS

| DE | 348047 C | 2/1922 |
| EP | 1188381 A1 | 3/2002 |
| GB | 1080417 | 8/1967 |
| NL | 34253 C | 12/1934 |
| NL | 6511383 A | 8/1966 |

* cited by examiner

Primary Examiner — Richard Price, Jr.
(74) Attorney, Agent, or Firm — The Webb Law Firm

(57) ABSTRACT

A device for separating an intestine subjected to a pulling force from a structure such as a fatty structure connected to the intestine by cutting includes a guide for guiding at least the intestine; and a cutting member connected to the guide for severing the structure in the vicinity of the intestine. The cutting member is adapted to sever the structure as closely as possible to the intestine. Further, a method includes fixing the structure, exerting a pulling force on the intestine, guiding the intestine and severing the structure in the vicinity of the intestine, wherein the combination of the structure and the intestine is guided prior to the cutting.

14 Claims, 4 Drawing Sheets

DEVICE AND METHOD FOR SEPARATING A FATTY STRUCTURE CONNECTED TO AN INTESTINE FROM THE INTESTINE BY MEANS OF CUTTING

CROSS-REFERENCE TO RELATED APPLICATIONS

This application is the United States national phase of International Application No. PCT/NL2013/050086 filed Feb. 14, 2013, and claims priority to Netherlands Patent Application No. 2008327 filed Feb. 21, 2012, the disclosures of which are hereby incorporated in their entirety by reference.

BACKGROUND OF THE INVENTION

1. Field of the Invention

The present invention relates to a device for separating an intestine subjected to a pulling force from a fatty structure connected to the intestine.

2. Description of Related Art

Intestines, guts or bowels are traditionally used in the production of sausage. Substances present on the inside of the intestinal wall are also applied in the manufacture of medicines. There is therefore a need to detach the intestines of slaughtered animals to enable further processing thereof. This relates substantially to intestines of pigs, cattle and sheep. It has otherwise been found that the measures according to the invention produce good results, particularly in the case of pigs.

In the case of sheep and pigs, the small intestine and the duodenum are attached in serpentine form to a fatty structure. The large intestine is in principle also attached to this fatty structure, but the large intestine is less suitable for further processing. The measures according to the present invention therefore relate solely to the separation of the small intestine and the duodenum from the fatty structure. During slaughtering of the animal, the fatty structure is cut out of the carcass together with the intestines attached thereto. The small intestine and the duodenum then have to be separated from the fatty structure. The fact that the intestines extend in loops and parts of the intestines lying close to the fatty structure are connected to the fatty structure makes separation of the intestines and the fatty structure particularly difficult. This separating process thus takes place by hand. It is noted that the fatty structure consists not only of fat but also of other parts, such as blood vessels. It is precisely the blood vessels which form a strong connection between the intestines and the fatty structure. The fatty structure is therefore also referred to hereinbelow as a structure.

It is known to pull the intestines loose of the fatty structure by hand at the positions where the intestines are connected to the fatty structure. It is likewise known to sever the connection between intestine and fatty structure using a knife. In both cases it is difficult and time-consuming work. Particularly where use is made of a knife, there is a great danger of the intestine being damaged.

To avoid these drawbacks NL-A-6 511 383 discloses a device for separating an intestine subjected to a pulling force from a structure, such as a fatty structure, connected to the intestine, wherein the device comprises a guide adapted to guide a part of the structure lying close to the intestine from the feed side of the guide and a cutting member connected to the guide for the purpose of severing the structure in the vicinity of the intestine.

In this prior art device the guide means are adapted to guide the fatty structure or the intestine after the separation. The cutting, and thereby the separation of the intestine and the fatty structure take place here prior to the guiding so that the guiding is not optimal and the position of the cut is greatly subject to variation. This is undesirable on the one hand because the inaccuracy of the cut increases the chance of the cut extending into the intestine and the intestine thereby being damaged, and on the other because it is important to make the cut as close as possible to the intestine. After all, the attachment between the fatty structure and the intestine is formed largely by blood vessels. When the cut extends some distance from the intestine, the remaining intestine is provided with portions of severed blood vessel. When the intestine is processed to sausage, these result in a less attractive appearance of the sausage. Intestines provided with such blood vessel portions therefore have a lower market value. Although these blood vessel portions can be removed, this results in costly and time-consuming additional work. It is therefore important to have the cut between the intestine and the fatty structure take place as close as possible to the intestine, but without damaging the intestine.

In most cases the fatty structure is cut from the carcass as one whole together with the intestines when the animal is slaughtered. It is however also a possibility that the fatty structure is not cut from the carcass as a whole or is cut in parts from the carcass, or that the severed fatty structure is divided before the intestines are separated from the fatty structure. The invention likewise applies to such a situation. Not precluded here is that portions of fatty structure are individually fixed and that the separation from the intestines then takes place. The invention also applies to such a situation.

The object of the invention is to provide such a device, wherein the cut takes place as precisely as possible so as to enable the cutting to be performed as close as possible to the intestine without damaging the intestine.

SUMMARY OF THE INVENTION

This object is achieved with a device of the above stated type, wherein the guide comprises a gap arranged therein, the feed end of which is opened, the gap being adapted to guide the separation between the intestine and the fatty structure connected with the intestine from the feed end of the gap. The gap may be closed at its rear end, which implies that the parts of the guide separated by the gap are connected downstream of the gap to form a single guide.

Preferably the gap extends in meandering manner over at least a part of the gap. As a result of the relative movement of the fatty structure relative to the guide plate, the tensioned intestine is pulled to only a small extent into the gap. The flexibility of the structure does make this lateral movement possible, so that the guiding is better defined on the intestine.

This embodiment also provides a method in which the combination of the fatty structure and the intestine is subjected to a movement to and fro perpendicular to the longitudinal direction of the gap.

According to a further embodiment, the width of the gap decreases over at least a part of the gap from the open end toward the position of the knife. Guiding of the fatty structure is hereby enhanced, a certain degree of positioning is obtained, and jamming, which could result in tearing of the fatty structure before it is separated from the intestine, and thereby in the intestine being damaged, is prevented.

Preferably the gap extends until beyond the cutting member, the gap separates the guide into a first partial guide and a second partial guide and the first and the second partial guide are connected by a bridge. The gap may be a trough going gap, but it is also possible that both partial guides are connected at the rear end of the guide.

The cutting member is preferably placed in the vicinity of the discharge end of the guide and directed with its cutting edge toward the feed end of the guide. As a result of these measures the guiding of the intestines takes place prior to the cutting so that a better guiding of the intestines, and thereby of the fatty structure, is obtained and the positioning of the cut can take place more precisely so that the cut can be made as close as possible to the intestine, without damaging the intestine. Because the fatty structure is usually guided such that some tension is applied to the fatty structure, particularly in the vicinity of the attachment to the intestine, the fatty structure will here have a smaller width. The fatty structure is hereby so narrow that it is guided through the gap in the guide, and the intestine remains under the guide. To avoid damage of the intestine, the cut preferably takes place at some distance from the guide. Consequently, according to an embodiment, the cutting member is connected to the guide at some distance from the guide. A distance of some millimetres is maintained, such as 1 mm, 1.5 mm or 2 mm.

Preferably the cutting member comprises a knife connected to the guide with its cutting edge at a distance from the guide, that the cutting edge of the knife is connected to the guide plate at an angle differing from 90° to the main direction of the gap and that the main plane of the knife intersects the main plane of the guide plate. Consequently the relative movement between the knife and the structure to be cut a component in the direction of the cutting edge of the knife, and allows the part cut off from the structure to be taken away easily.

The desired cutting speeds in the present invention are high, so that wear of the knife is also considerable. In order to enable easy replacement a knife which has become blunt with a sharp knife, it is therefore recommended that the knife is connected to the guide plate by means of a knife holder, and that the knife holder to be adapted to hold the knife in exchangeable manner.

Yet another embodiment provides the feature that the guide plate is provided at its feed end with a guide member on both sides of the gap for guiding the fatty structure. The cutting may be a continuous process, but because the fatty structure is a natural product it has irregularities, even if only as a result of the loop-shaped structure of the intestines, which result during cutting in stepwise springing back of portions of fat which have been cut but are still connected to the fatty structure. The at least one guide member prevents the springing back portions of fat resulting in irregularities in the process of guiding the fatty structure. Such guide members can otherwise be placed on both sides of the gap.

In order to facilitate entry of the fatty structure into the gap and the guiding thereof, it is recommended that the guide plate is concave on the side of the knife.

As stated before, the invention may be adapted as tool to be handled by hand. Therefore a further embodiment provides the feature that a handle is connected to the guide.

It is however also possible for the invention to be implemented in a larger whole, i.e. a machine, which is adapted to sever the intestine from the fatty structure as automatically as possible. Here the guide as initially elucidated forms part of the whole machine. A relevant embodiment therefore provides a device of the above elucidated type, wherein the guide is connected to a frame to which are connected fixation means for fixing the fatty structure in a position on the feed side of the gap in the guide plate, and to which are connected pulling means for exerting a pulling force on the severed part of the intestine, wherein the pulling means are located at the discharge end of the guide and the pulling means are adapted to exert a pulling force extending substantially in the longitudinal direction of the guide. It is noted that the pulling force continues in the part of the intestine not yet severed. This pulling force is essential, together with the meandering gap for positioning the intestine relative to the guide before being severed from the fatty structure.

In the device for manual use the user can adjust the position. In order to create the same option in the automatically operating device, it is recommended that the guide is connected to the frame by means of a connection allowing movement in a transverse direction of the intestine. This connection is preferably adapted to allow such a movement only in the vertical direction, but it is also possible that the cutting member is placed for movement in the longitudinal direction relative to the guide. In such a device it is structurally attractive for the holding means to be provided with two clamping jaws preferably extending in the longitudinal direction of the gap in the guide plate for the purpose of fixedly holding the fatty structure.

This embodiment moreover provides a method for separating an intestine from a structure such as a fatty structure connected to the intestine by means of cutting, comprising of fixing the structure, exerting a pulling force on the intestine, guiding the intestine and severing the structure in the vicinity of the intestine, wherein the combination of the structure and the intestine is guided prior to the cutting.

Preferably the structure is severed a short distance from the intestine and that the guiding of the transition between intestine and structure takes place on either side of the structure. Further it is attractive when the device for guiding the intestine and the fatty structure and for cutting the interface between the intestine and the fatty structure is guided by hand.

BRIEF DESCRIPTION OF THE DRAWINGS

The present invention will be elucidated hereinbelow with reference to the accompanying drawings, in which.

DESCRIPTION OF THE INVENTION

Figure 1:
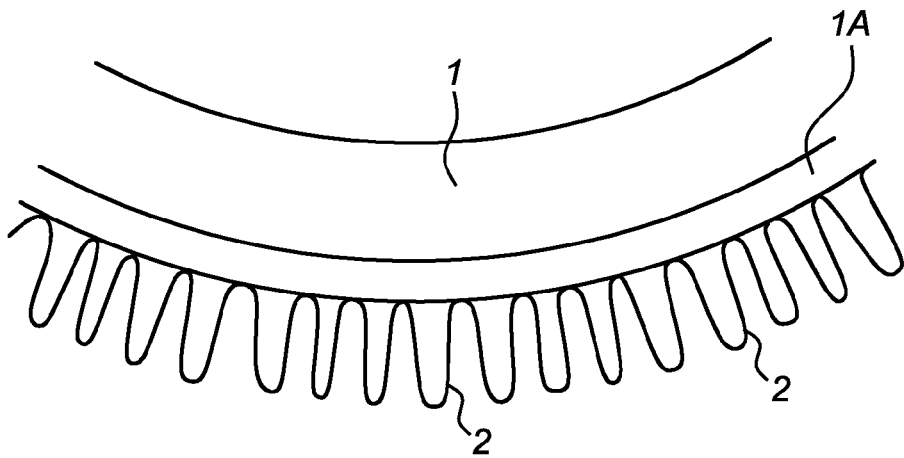
FIG. 1 is a schematic side view of a combination of a fatty structure with an intestine attached thereto.

FIG. 1 shows a fatty structure 1 in combination with a small intestine 2 attached thereto. During slaughtering of an animal, such as a pig or a sheep, this combination is cut out of the carcass of the slaughtered animal. The small intestine 2 has a length of about 22 m in a pig. The small intestine 2 extends in loops, and the loops are attached to fatty structure 1. The intestine serves, among other purposes, for absorbing nutrients from the material present in the intestine into the blood. Many blood vessels 3 extend for this purpose through the intestinal wall 2. These blood vessels 3 also form a firm connection between the intestine and the fatty structure 1. When the intestine 2 is separated from the fatty structure 1, the connecting blood vessels 3 must therefore also be separated. The density of the blood vessels 3 is therefore particularly high in the part 1a of the fatty structure 1 extending in the vicinity of the intestine 2.

Figure 2:
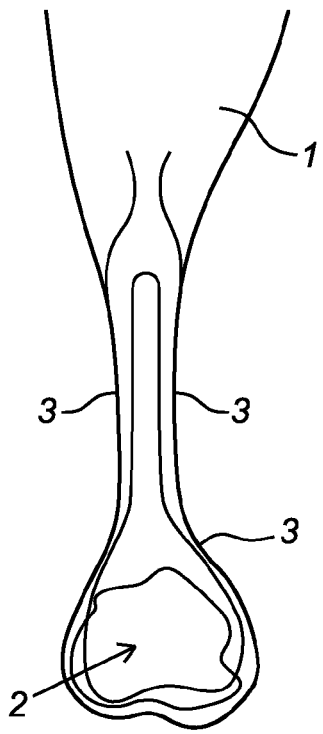
FIG. 2 is a schematic cross-sectional view of the combination shown in FIG. 1.

FIG. 2 shows the same combination in cross-section. Shown here is how the part of the fatty structure 1 in the vicinity of the intestine is relatively narrow. Particularly this part of the fatty structure has a high density of blood vessels 3. These blood vessels 3 always lead toward or away from the intestinal wall. The separation between the intestines 2 and the fatty structure 1 preferably takes place as close as possible to the intestine 2 in order to avoid as far as possible having any structures attaching to the intestine.

Figure 3:
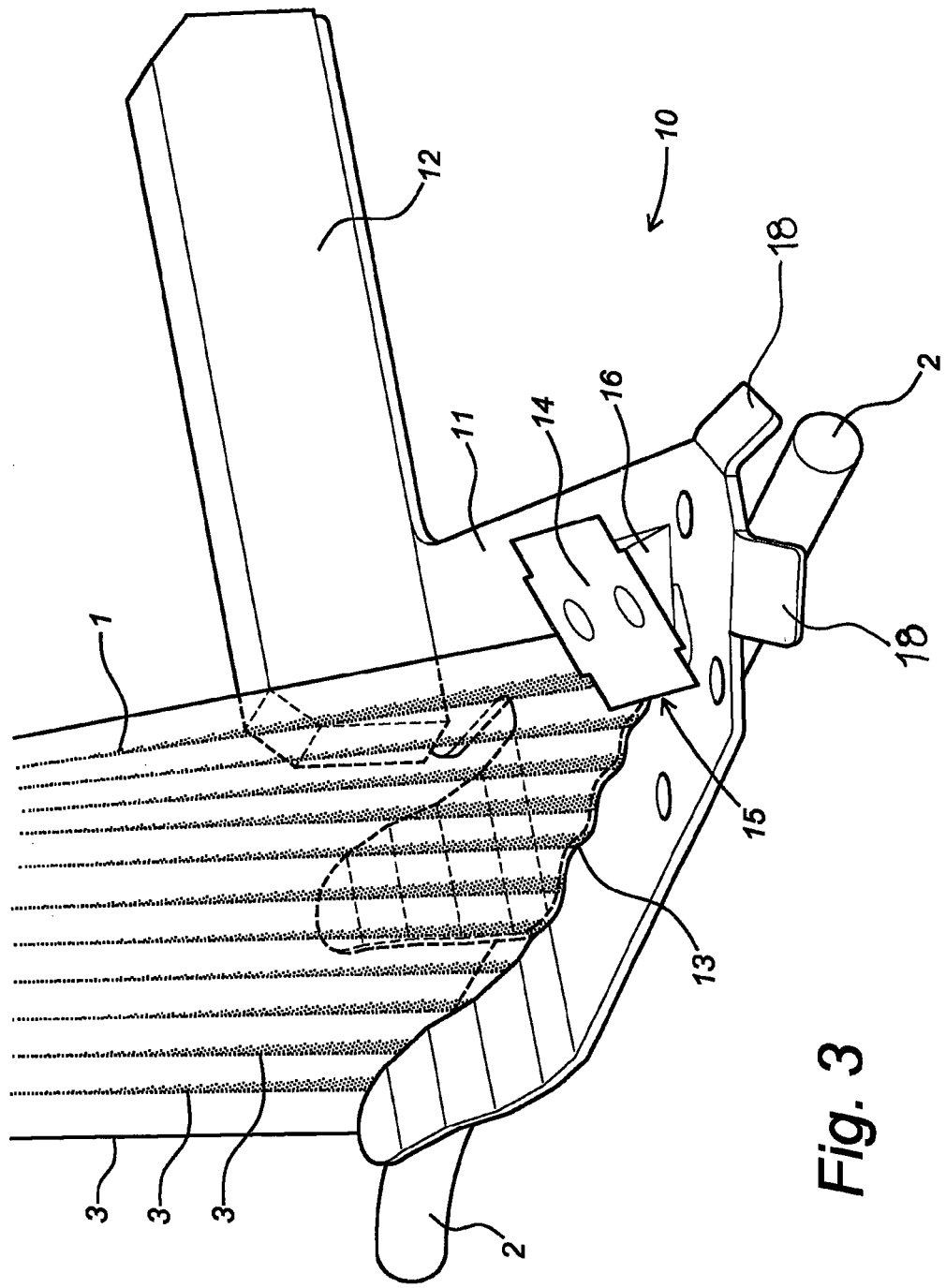
FIG. 3 is a schematic perspective view of a first embodiment of the invention.

According to a first embodiment, use is made here of the cutting device shown in FIG. 3, which is designated as a whole with 10. This cutting device 10 comprises a guide plate 11 which is manufactured from stainless steel and on which is mounted a handle 12 for manual handling of cutting device 10. Arranged in guide plate 11 is a gap 13 extending in the longitudinal direction of the guide plate. This gap 13 is considerably wider at its open end than at its closed or blind end. It will be apparent that gap 13 divides guide plate 11 into two pieces which are mutually connected by that part of the guide plate in which gap 13 does not extend. The remaining part of gap 13 extends in meandering fashion, optionally in a zigzag pattern. In this embodiment this part has a substantially constant width, although it is likewise possible also to have the width of gap 13 decrease here from the feed end toward the discharge end of the gap. It is also possible to have the width of the gap increase again from the cutting member. This is particularly attractive when the gap extends over the full length of the guide plate and the guide plate is divided into two pieces. Guide plate 11 itself extends in a slight curve. The curvature is upwardly concave here.

A cutting member in the form of a knife 14 is placed on the upper side of guide plate 11, above the part of guide plate 11 where gap 13 does not extend. In the embodiment shown here the knife is formed by a razor blade 14, although it will be apparent that other types of knife could likewise be chosen. Knife 14 is directed with its cutting edge 15 toward gap 13. Knife 14 is further placed such that cutting edge 15 extends at an angle differing from 90° relative to the longitudinal direction of gap 13. It is in fact also possible to place the knife at an angle of 90° to the longitudinal direction of the gap. The knife 14 itself is also placed at an angle relative to the main plane of guide plate 11. Knife 14 is connected to guide plate 11 by means of a holder represented in the drawing by a wedge 16. Guide plate 11 is also provided on its feed side with a pair of downward bent ears 18 which serve as guide for the detached intestine 2.

During use of cutting device 10 according to the invention use is made of a pulling device (not shown in the drawings) which subjects the intestine 2 to a pulling force and which is adapted to receive the detached intestine 2. Use is also made of a clamping device 20 for fixedly clamping the fatty structure 1. The fatty structure is initially clamped with its side remote from the small intestine 2 in clamping device 20, and an end of the small intestine 2 already detached during slaughter is fixed in the pulling device. The user then places cutting device 10 according to the invention above the detached end of intestine 2, and with the end of the fatty structure 1 in gap 13 of the device. The pulling device is then switched on for the purpose of receiving the detached intestine 3. The user will then hold cutting device 10 such that the intestine 2 is severed as closely as possible to the intestine from the fatty structure 1. Cutting device 10 according to the invention here facilitates the guiding of the intestine 2 and the fatty structure 1, and less rigorous standards for handling cutting device 10 apply for the user so that the intestine 2 is severed from the fatty structure 1 with less difficulty.

Figure 4:
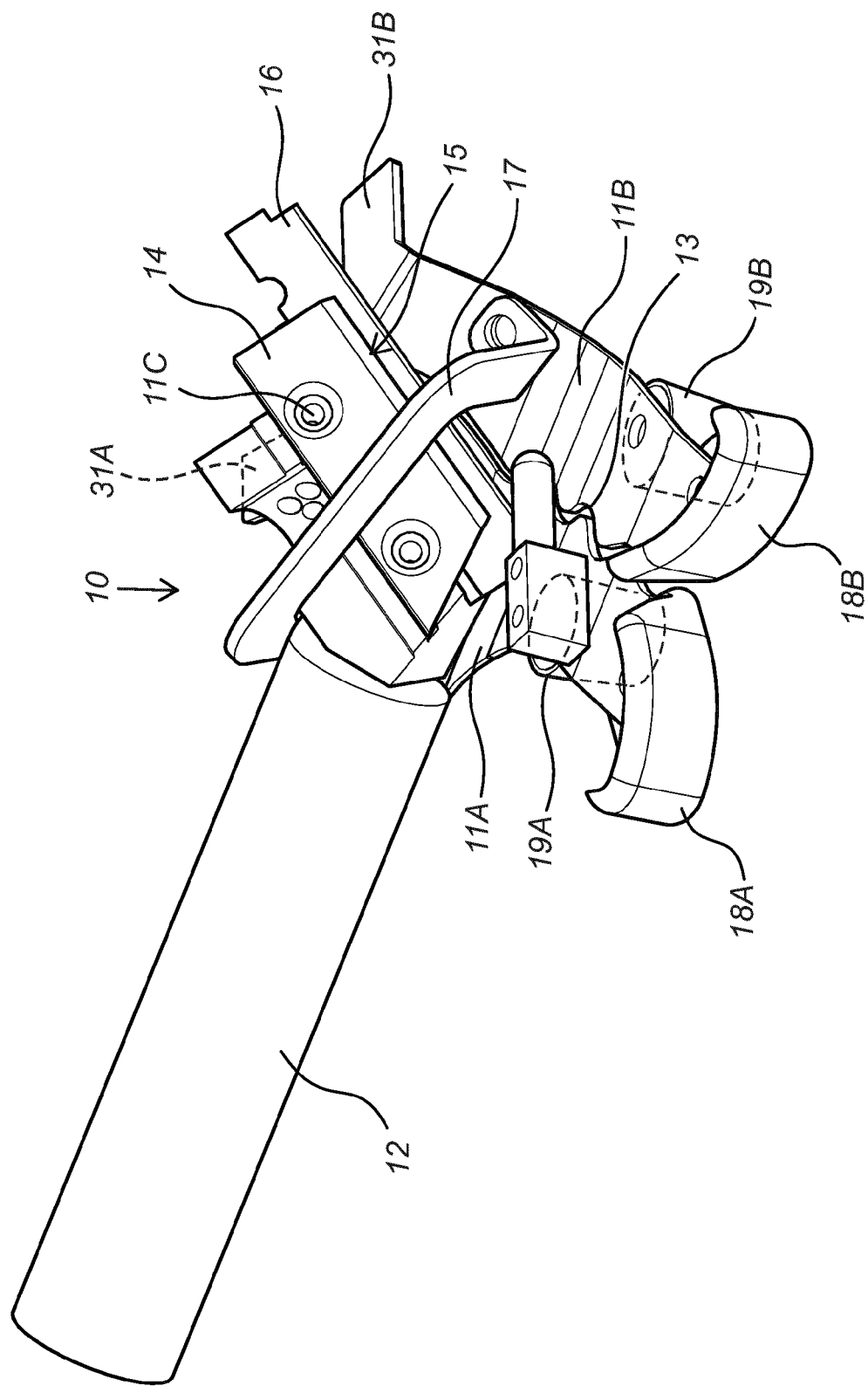
FIG. 4 is a schematic perspective view of a second embodiment of the invention.

The embodiment of the cutting device 10 depicted in FIG. 4 also comprises a guide plate 11, separated into a first section 11A and a second section 11B by a meandering gap 13. The gap 13 extends over the largest part of the length of the guide plate 11, while the first and second sections 11A, 11B of the guide plate are connected by a connecting section 11C. A handle 12 is connected with the section 11A of the guide plate 11. It is noted that, instead of the guide plate 11, other kinds of guide may be used such as guide bars. The sections 11A and 11B are mutually connected by a U-shaped bridge, besides by the connecting section 11C. Just as in the preceding embodiments, a knife 14 with its cutting edge 15 on a distance from the gap 13, tilted relative to the main plane of the guide plate 11 and oblique relative to the main direction of the gap is located on a holder 16 having the shape of a wedge. The width of the gap increases from the feed end to the position of the knife 14.

At the feed end of each of the sections 11A, 11B of the guide plate 11, an entrance guide 18A, 18B respectively is located. These entrance guides 18a, 18B ease the entrance of the structure into the gap 13. The entrance guides 18A, 18B each have a greater height than the thickness of the guide plate 11. At their ends leading to the gap 13, the entrance guides both are chamfered in a mutual opposite direction. At the lower side of each of the guide plate sections 11A, 11B a guide knob 19A, 19B respectively has been provided, which serve for guide that part of the structure moving under the guide plate 11, in particular for damping the rebound of the structure during cutting, which structure as irregularities as caused by the looped shape of the intestines. At the discharge end of the guide plate 11, both sections of the guide plate 11A, 11B are provided with a tab 31A, 31B respectively, which serve to guide the severed intestine 2.

Both tabs are folded downwardly and they enclose the substantially triangular face. It is noted that the space between the tabs connects to the connection section 11C between both sections 11A, 11B of the guide plate 11, and that the gap 13 extends until into the tab 31A and stops there.

Further, an arm has been connected to the lower face of the guide plate 11, extending from the guide plate section 11A, on some distance from the guide plate in the direction to the gap until beyond the gap. The arm extends on that side of the gap 13 in the guide plate 11, where the knife 14 and its cutting edge 15 are directed towards the feed end of the gap. The arm extends further somewhat in the direction to the discharge end of the guide plate. Hence the fatty structure faces from the side of the knife at the under side, so that the cutting edge extends more perpendicular to the longitudinal direction of the fatty structure.

Figure 5:
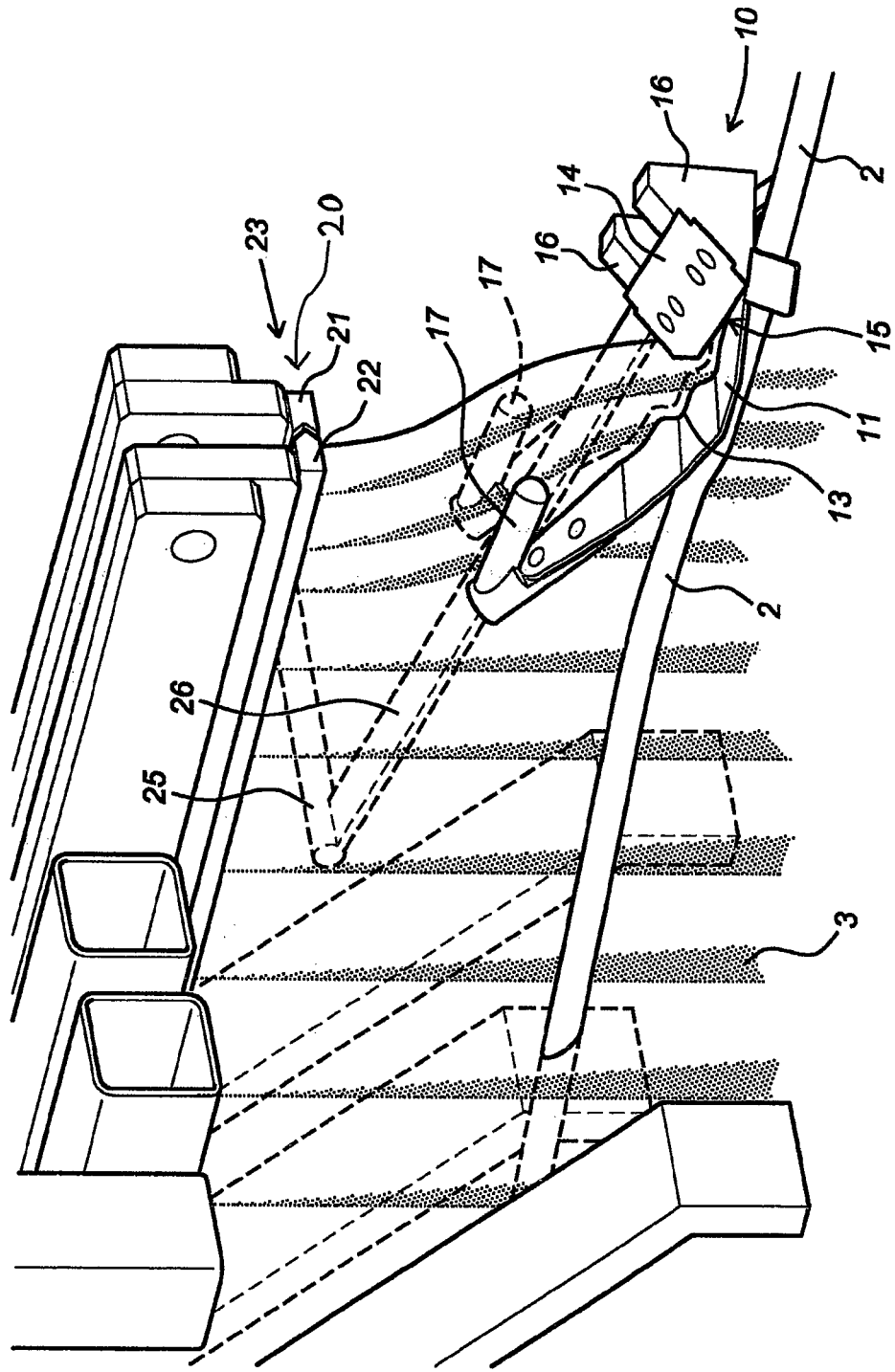
FIG. 5 is a schematic perspective view of a third embodiment of the invention.

FIG. 5 shows a third embodiment of the invention, wherein the cutting device according to the invention is placed in a machine for separating the intestine from the fatty structure. Mounted for this purpose on a frame of the machine (not shown in the drawing) is a spacer 25 to which is fixed a rod 26 which is connected to guide plate 11 of a cutting device 10 according to the invention. Cutting device 10 corresponds here to the cutting device 10 shown in FIG. 3, with the proviso that handle 12 is omitted and that guide plate 10 is mounted by means of rod 26. Rod 26 is connected resiliently to the frame so that the horizontal position of guide plate 10 is variable. It is likewise possible for the vertical position of the guide plate to be variable.

The device further comprises a clamping member 20, which is formed by two clamping jaws 21, 22 which are urged toward each other by means of urging means 23. Clamping member 20 can also be moved in axial direction in order to feed the fatty structure 1 with the intestine 2 attached thereto toward cutting device 10. The device also comprises a pulling member (not shown in the drawing) for applying a pulling force to the detached part of intestine 2. It is noted that in this embodiment the pulling member forms part of the device as well as clamping device 20; this in contrast to the above discussed embodiment, wherein the invention relates only to cutting device 10.

The cutting device 10 shown in FIG. 5 otherwise differs in details from the embodiment shown in FIG. 3; guide plate 11 of the embodiment shown in FIG. 4 is thus bent in a manner other than guide plate 11 of the embodiment shown in FIG. 3. The embodiment shown in FIG. 4 is also provided with two guide members 17 on either side of gap 13. These guide members 17 serve as guide for the fatty structure 1. It is noted that these differences are irrespective of the use of cutting device 10 as part of a larger machine or as a device to be handled manually.

The use of this device does not differ from that of the embodiment to be handled manually, with the proviso that cutting device 10 is fixedly mounted and that the alignment of cutting device 10 will have to take place in accurate manner relative to the fixation device, perhaps subject to the dimensions of the fatty structure 1, so as to be able to cut as closely as possible to the intestine 3 without the danger of damaging the intestine 3.

Numerous changes can otherwise be made to the device within the scope of the claims.

The invention claimed is:

1. A device for separating an intestine subjected to a pulling force from a structure such as a fatty structure connected to the intestine by cutting, wherein the device comprises:
   a guide for guiding at least the intestine; and
   a cutting member connected to the guide and directed with its cutting edge toward the feed end of the guide, wherein the guide comprises a gap arranged therein, the feed end of which is opened, the gap being adapted to guide the separation between the intestine and the fatty structure connected with the intestine from the feed end of the gap, and wherein the gap extends in a meandering manner over at least a part of the gap.

2. The device as claimed in claim 1, wherein the width of the gap decreases from the feed end toward the position of the cutting member.

3. The device as claimed in claim 1, wherein the gap extends until beyond the cutting member.

4. The device as claimed in claim 3, wherein that the gap separates the guide into a first partial guide and a second partial guide and that the first and the second partial guide are connected by a bridge.

5. The device as claimed in claim 3, wherein the guide plate is provided at its feed end with a guide member on both sides of the gap for guiding the fatty structure.

6. The device as claimed in claim 1, wherein the cutting member comprises a knife connected to the guide with its cutting edge at a distance from the guide, that the cutting edge of the knife is connected to the guide plate at an angle differing from 90° to the main direction of the gap and that the main plane of the knife intersects the main plane of the guide plate.

7. The device as claimed in claim 6, wherein the knife is connected to the guide plate by a knife holder and that the knife holder is adapted to hold the knife in an exchangeable manner.

8. The device as claimed in claim 1, wherein a handle is connected to the guide.

9. The device as claimed in claim 1, wherein the guide is connected to a frame to which are connected fixation means for fixing the fatty structure in a position located on the feed side of the guide, and to which are connected pulling means for exerting a pulling force on the severed part of the intestine, wherein the pulling means are located at the discharge end of the guide and the pulling means are adapted to exert a pulling force extending substantially in the longitudinal direction of the guide.

10. The device as claimed in claim 9, wherein the guide is connected to the frame by means of a connection allowing a movement in a transverse direction of the intestine.

11. The device as claimed in claim 9, wherein the cutting member is placed for movement in the longitudinal direction relative to the guide.

12. A method for separating an intestine from a structure such as a fatty structure connected to the intestine by cutting, comprising of:
   fixing the structure;
   exerting a pulling force on the intestine;
   guiding the intestine; and
   severing the structure in the vicinity of the intestine,
   wherein the combination of the structure and the intestine is guided prior to the cutting.

13. The method as claimed in claim 12, wherein the structure is severed a short distance from the intestine and that the guiding of the transition between the intestine and the structure takes place on either side of the structure.

14. The method as claimed in claim 13, wherein the device for guiding the intestine and the fatty structure and for cutting the interface between the intestine and the fatty structure is guided by hand.

* * * * *